H. W. HILL.
LENS MOLDING MACHINE.
APPLICATION FILED OCT. 6, 1917.
1,332,725.
Patented Mar. 2, 1920.
3 SHEETS—SHEET 3.
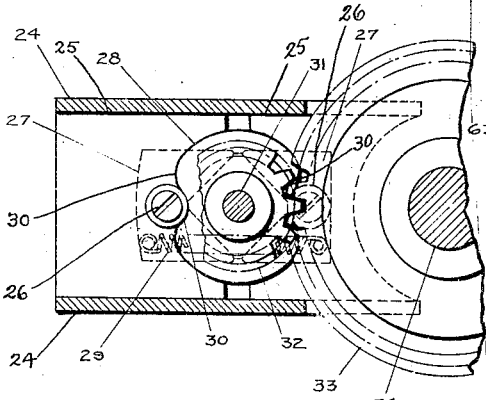
FIG. VII.
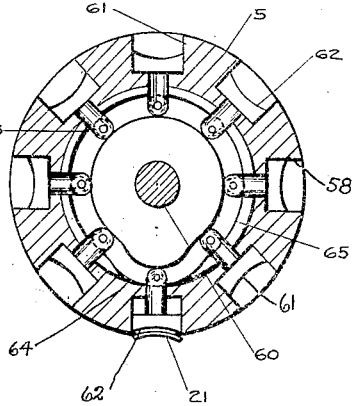
FIG. IV.
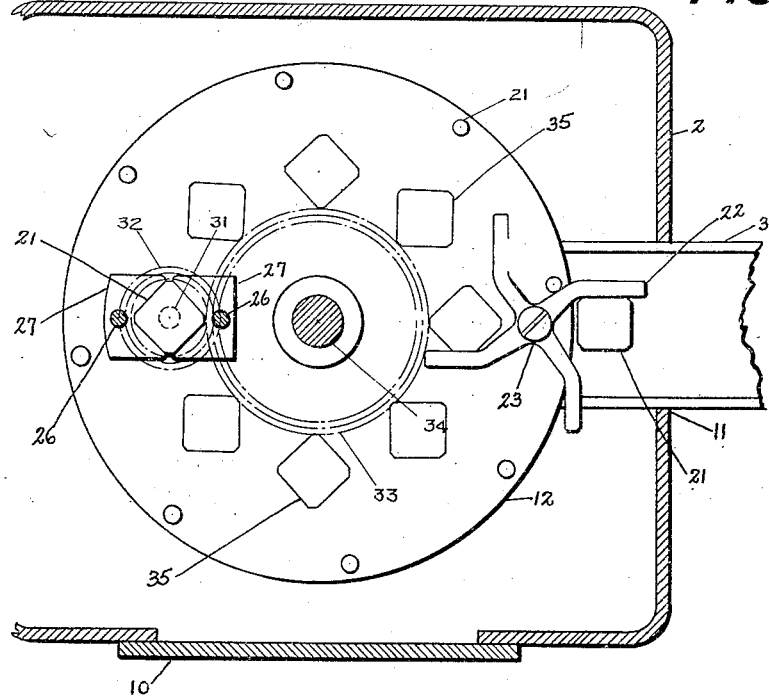
FIG. VI.
INVENTOR
HARRY. W. HILL
BY
H. H. Styll  H. H. Parsons
ATTORNEYS

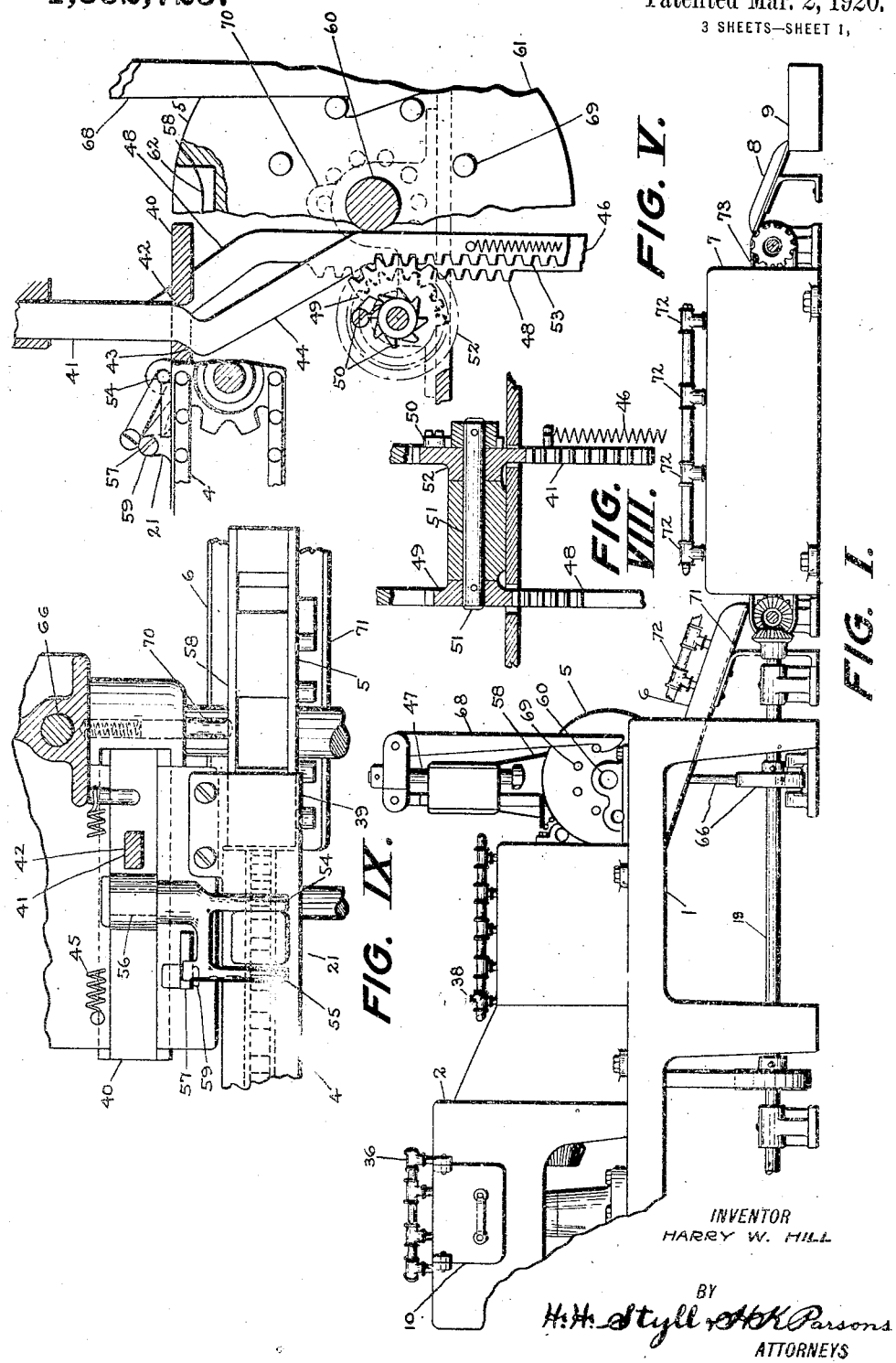

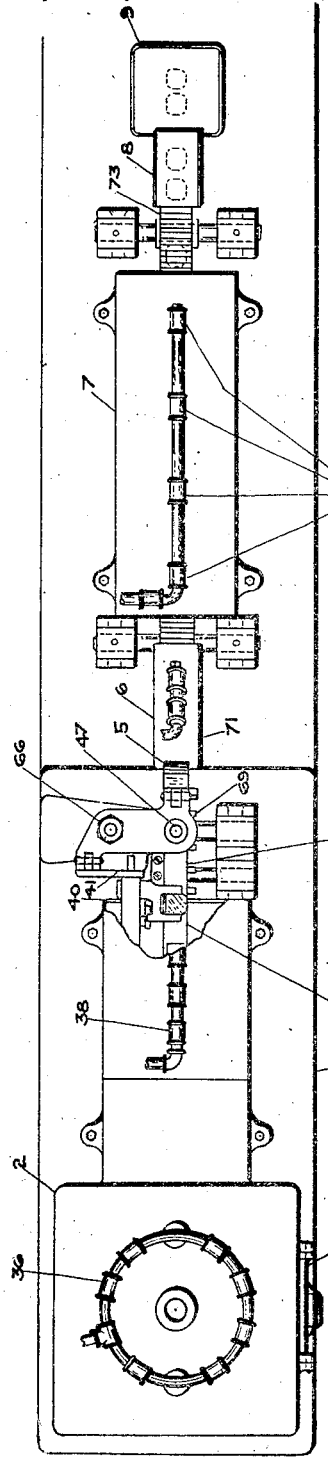
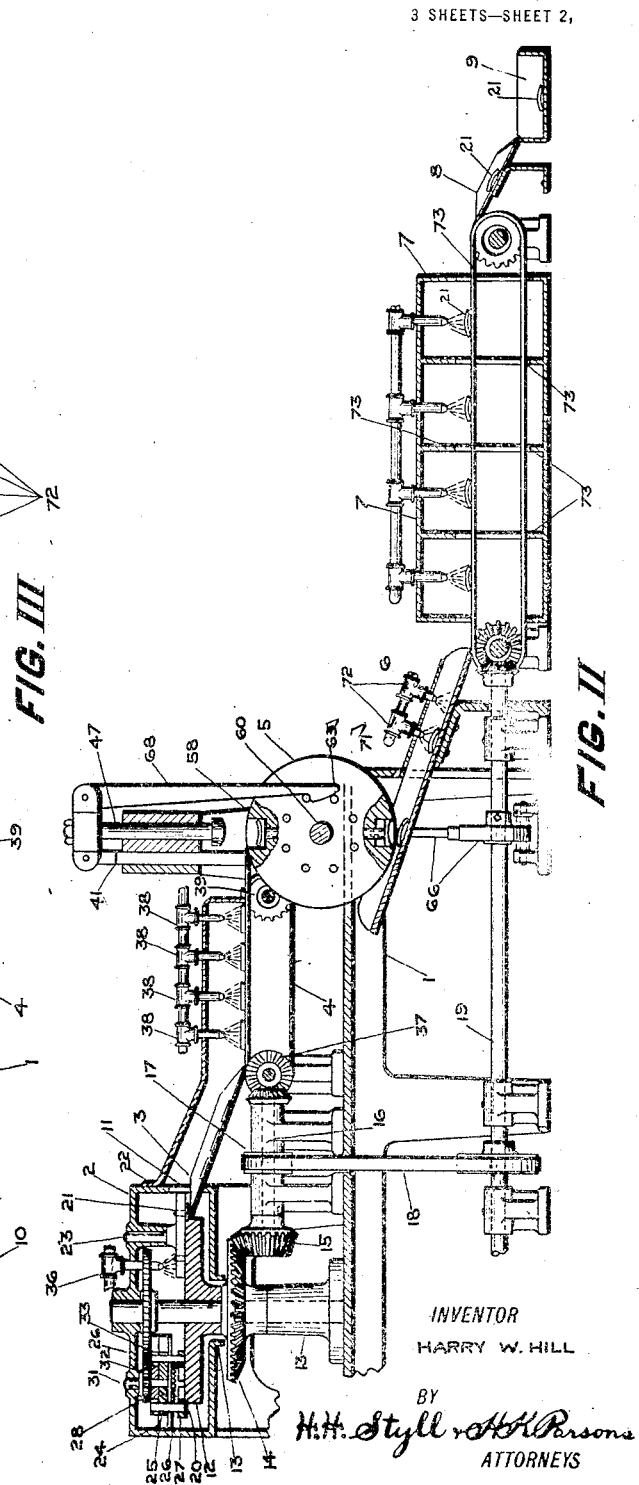

UNITED STATES PATENT OFFICE.

HARRY W. HILL, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

LENS-MOLDING MACHINE.

1,332,725.     Specification of Letters Patent.     Patented Mar. 2, 1920.

Application filed October 6, 1917. Serial No. 195,039.

*To all whom it may concern:*

Be it known that I, HARRY W. HILL, a citizen of the United States, residing at Southbridge, in the county of Worcester and State of Massachusetts, have invented certain new and useful Improvements in Lens-Molding Machines, of which the following is a specification.

This invention relates to improvements in lens molding machines and has particular reference to an improved machine for automatically receiving rough glass stock and producing finished lens blanks.

One of the leading objects of the present invention is the provision of an improved automatically operating machine which shall serve to heat the stock, mold the same and subsequently anneal the blanks.

Other objects and advantages of my improved construction should be readily apparent by reference to the following specification taken in connection with the accompanying drawings, and it will be understood that I may make any modifications in the specific details of construction shown and described within the scope of the appended claims without departing from or exceeding the spirit of my invention.

Figure I represents a side elevation of my entire machine.

Fig. II represents a longitudinal sectional view therethrough.

Fig. III represents a top plan view thereof.

Fig. IV represents a detail view of one form of ejector mechanism adaptable for use in connection with my mold.

Fig. V represents an enlarged detail view of the blank shift for properly positioning the blanks within the mold.

Fig. VI represents a plan view of the heating chamber with cover removed but parts carried by the cover left in position.

Fig. VII is a detailed plan view of the heating chamber, parts thereof being broken away and illustrated in section.

Fig. VIII is a transverse sectional view of the means for operating the blank shift, and Fig. IX is a detailed plan view illustrating the manner of transferring blanks from the conveyer to the mold.

In the drawings, in which similar characters of reference have been employed to denote corresponding parts throughout the several views, the numeral 1 designates the main frame of my improved machine or apparatus having mounted thereon the oven or heating member 2, from which leads the chute 3 and conveyer 4 to the multiple mold cylinder 5, having extending therefrom the carrier or conveying device 6 to the annealing chamber 7, from which extends a discharge member 8 to the receptacle 9 adapted to receive the completed blanks.

Referring first to the oven or heating device 2, and particularly to Figs. II and VI respectively, illustrating a longitudinal sectional and a plan view with cover removed of this portion of my invention, it is to be noted that the casing of the member 2 has a door-opening or receiving aperture 10 in the front thereof and at one side the discharge aperture 11 connecting with the trough 3. Disposed within the chamber 2 is the rotatable table 12 journaled as on the bearing 13 and adapted to be rotated by the gear 14 meshing with the pinion 15 on the driven shaft 16, having a pulley 17 to receive a suitable driving belt 18 leading to the main drive shaft 19. This table, as clearly illustrated in Fig. II, is under cut or has a slight flange 20 at the edge thereof allowing the chute or trough 3 to fit under the edge of the table to better receive the portions of stock 21 as they are discharged from the heating chamber. Rising from the flange 20 are the pins 21' adapted to contact with the arms 22 of the ejector to cause rotation of these arms as the table is moved so that the arms will sweep off the heated or plastic blank from the surface of the table through the discharge aperture 11 onto the receiving trough 3. This ejector is pivoted as by the stud 23 to the top of the chamber, as clearly shown in Fig. II. In addition there is depending from said top the frame 24 bearing the slides 25 of the puddler arms 26 bearing on their lower ends, the puddler ends 27 slidably resting upon the table 12. Said slides are preferably actuated as by the cam 28 and spring 29, rotating of the cam serving to force the slides outward, while they are automatically drawn into inward or puddling position by the spring 29 as the indentations 30 of the cam come into alinement with the slides, as should be readily understood by reference to Fig. VII. The cam is rotatably mounted within the frame 24, preferably held by a direct stud 31 carried by the cover and its rotation is controlled by the pinion 32 meshing with the gear 33 carried by the post 34 on the stock supporting table 12, the connection of the parts in this manner insuring operation of the puddler at predetermined intervals and the table having portions suitably designed as at 35 so that the stock may be originally so positioned on the table as to be properly engaged by the puddling members as it passes through the oven or furnace member 2. It is to be understood that at the time the puddling operation takes place the glass is in a viscous or semifluid condition, being softened sufficiently to tend to flow somewhat and to be capable of ready molding or modeling and that while in this condition it is engaged by the puddling members 27 which sliding over the table engage and form up the stock into substantially the desired form, in which form it passes undisturbed around the oven where the heat while maintaining it in a soft condition is insufficient to cause it to further flow or vary appreciably from its pressed or semi-molded shape as applied by the puddling devices, and by the time it reaches the conveyer carrying it to the mold it will have cooled slightly and be sufficiently stiff to resist any appreciable distortion caused by contact of the transfer member 22 therewith. This condition, however, at the period of the puddling operation is sufficiently soft so that it may be shaped and pressed together, and in this pressing operation the layers will tend to be broken up or crowded together and at the same time any bubbles forced out or dispelled, thus improving the condition of the glass.

The furnace member 2 may be heated in any desired manner as by gas, electricity or the like, for convenience of illustration the same having been shown as equipped with a series of burners 36. It will thus be seen that when the stock is properly inserted as through the aperture 10 to the correct position 35 on the table 12, as the table rotates the stock will be brought adjacent the series of burners 36 and as it passes by the several burners will be heated to a plastic but not molten condition, and that while in this plastic condition it will be automatically puddled by the puddler ends 27, serving to both shape the rough stock and to change its character, eliminating striæ and other defects in the glass through this puddling of the plastic material and then it will be subsequently carried around by the table until it comes in contact with the arms of the ejector 22, while contact of the moving pins 21′ with other of the arms 22 will serve to rotate the ejector so that the blank will pass into the discharge trough 3, as illustrated in connection with Fig. II. Immediately adjacent the trough 3 in position to receive blanks therefrom is the conveyer 4 driven as by the intermeshing gear and pinion connection 37 from the shaft 16, this conveyer being preferably inclosed and having extending therewithin the additional heating burners 38 serving to maintain or increase the temperature of the puddled and plastic blank 21 so that the blank will be discharged from the conveyer at the desired temperature.

At the opposite end of the conveyer I have shown the receiving plate 39 onto which the blocks are automatically forced by the conveyer, while adjacent said plate is the slide 40 controlled as by the operating cam slide bar 41, this bar passing through the aperture 42 in the slide and having the portion 43 extending slightly in one direction and the portion 44 inclining in the opposite direction whereby as the bar is reciprocated through the aperture the slide will be given a slight movement in the direction of the conveyer, followed by a separate pronounced movement in the opposite direction, the spring 45 serving to press the slide normally in the direction of the conveyer and a suitable spring 46 returning the operating bar to its normal or depressed position. The bar is given a temporary upward movement during actuation of the presser rod or plunger 47 through the medium of the mutilated or short rack 48 meshing with the pinion 49 which is connected as by the dog and ratchet 50 to turn the spindle 51 as the plunger is initially depressed, while allowing the pinion to rotate without actuating the spindle on the upward movement of the plunger. The movement of the spindle is transferred through the second pinion 52 and rack 53 to the slide controlling bar to raise the bar and thus cause reciprocation of the slide at the initial movement of the plunger while the short length of the rack causing it to move out of engagement with the pinion 49 and thus allow the return of the parts before the plunger has completed its stroke.

Carried by the slide 40 is the blank shifting yoke having the arms 54 and 55, respectively, this yoke being pivotally secured to the slide as at 56. The arm 55 normally slides up on the dog 57 and is held in raised position so that the stock 21 may move therebelow and into engagement with the arm 54, which serves as a stop limiting the movement of the stock, as illustrated in connection with Fig. III. As the slide is given the slight movement in the direction of the conveyer, however, as actuated by the portion 43 of the control rod, the arm 55 is moved past the upper end of the dog 57 and drops down therebelow to engage the rear edge of the glass and cause it to slide forward, the movement of the slide being sufficient to carry the stock 21 over and allow it to drop down into one of the mold apertures 58 in the multiple cylinder 5, after which the disengagement of the rack 48 with the pinion 49 allows the control bar to shift the slide reversely to again assume the position illustrated in Fig. III and prevent additional blanks being supplied to the mold until the plunger is operated on the one already in position.

It is to be understood that the dog 57 is pivoted at 59 to allow this lower end to spring forward so that the arm 55 may pass thereunder during the operation of shifting the glass, the end of the dog dropping down immediately after the arm has passed to engage and raise the arm on reversal movement of the slide 40. The multiple cylinder 5 previously referred to is preferably mounted for rotation about the horizontal shaft 60, and is provided with a plurality of mold receiving apertures 61, in which is preferably slidably held the molds 62 having the depending arms 63 terminating in the studs or pins 64 riding in the stationary track 65, whereby as the cylinder 5 is rotated about the shaft 60 the uppermost or glass receiving mold will be depressed below the surface of the cylinder 5 so that the stock 21 may readily drop down thereinto from between the arms of the shift yoke, while as the cylinder is rotated the eccentric positioning of the track will shift the arms and thus the mold members 62 outward, as illustrated in Fig. IV, to satisfactorily eject the pressed blanks, as illustrated in connection with Figs. II and IV.

It will be noted that while I have spoken of the track as eccentric, that it may be either a purely eccentric track so that there is a gradual shifting of the molds, or the track may as a whole be arranged concentric with the shaft 60, and have merely an eccentric portion as has been specifically illustrated, the advantage of the latter form being that the glass will remain longer within the apertures, while being pronouncedly ejected at the necessary point, either of these constructions being employed as may prove more desirable for any particular work.

In any event the glass having been properly positioned by the shift yoke within the mold member the plunger 47 is automatically depressed through the driving connections 66 leading to the main drive shaft 19, thus insuring proper relative operation of the plunger with respect to the other parts of the apparatus, and bringing the upper mold section or plunger 67 into engagement with the stock 21 to cause it to assume the proper shape. At the same time the depressing of the rod 47 serves to force downwardly the shifting ratchet bar 68 causing it to engage the pins or ratchet members 69 on the cylinder 5 to impart the proper rotation to the cylinder on upward movement of the plunger rod to bring a new mold into operative position, a latch 70 serving to lock the cylinder in its newly adjusted position.

The blanks having been thus pressed into form remain temporarily in the cylinder until rotated to substantially diametrically opposite position, when either by their own weight or through the ejecting movement of the mold previously referred to, they are ejected into the conveyer or trough 71, where they come under the action of the heating devices 72 tending to again raise their temperature before they are discharged from the member 71 onto the endless conveyer 73 which slowly conveys the members 21 in their final form through the annealing oven 7, preferably divided as by the baffle plates 73 into a series of chambers where the temperature is gradually raised and subsequently lowered until the blanks are in substantially cold condition when they strike the trough 8 and are discharged into the receiving receptacle 9.

From the foregoing description taken in connection with the accompanying drawings it will be seen that it is merely necessary to supply power to the main drive shaft 19 and to place glass stock in any desired form within the member 2 when it will be automatically heated and puddled within the member 2 and discharged from said member through suitably heated conveying mechanism to the transfer yoke which automatically positions the properly puddled stock in the empty mold when the plunger contacts with the stock presses it to desired form, is withdrawn and the mold automatically shifted to for a time retain the glass until it is partially cooled and assumes the shape of the mold, when the stock is again ejected, subjected to heated action during the process of transfer and transferred to the annealing oven, from which it is subsequently discharged.

I claim:

1. In a device of the character described, the combination with a heating member, of means for automatically puddling the stock while within the heating member and additional means for automatically discharging the puddled stock from the heating member.

2. An apparatus for forming ophthalmic lens blanks, the combination with means for delivering plastic stock, of a series of molds to receive the stock, means for pressing the stock successively in the different molds, automatic transfer mechanism for supplying a portion of stock to the given mold upon initial actuation of the presser with respect to said mold, and means for automatically shifting the mold to inoperative position upon withdrawal of the presser.

3. In an apparatus for forming ophthalmic lens blanks, the combination with means for delivering stock in plastic condition, of a horizontal rotatable shaft, a cylinder mounted thereon bearing a plurality of molds, means for automatically controlling the rotation of the cylinder, and means for delivering a portion of plastic stock to the uppermost mold at each step in the rotation of the cylinder.

4. In a device of the character described, the combination with means for rendering the stock plastic, of automatic puddling means contained therewithin for operation upon the plastic stock, said puddling means including a frame, a pair of slides mounted within the frame, and bearing puddling heads and a driven cam for simultaneously shifting the slides equal amounts in opposite directions.

In testimony whereof I have affixed my signature, in presence of two witnesses.

HARRY W. HILL.

Witnesses:
  H. E. COLEMAN,
  E. M. HALVORSEN.